(12) United States Patent
Jackson, Jr.

(10) Patent No.: US 9,752,686 B2
(45) Date of Patent: Sep. 5, 2017

(54) SHAPE MEMORY ALLOY VALVE

(71) Applicant: A. Raymond & Cie, Grenoble (FR)

(72) Inventor: Nicholas Jackson, Jr., Davisburg, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 14/938,391

(22) Filed: Nov. 11, 2015

(65) Prior Publication Data
US 2016/0061345 A1 Mar. 3, 2016

Related U.S. Application Data

(62) Division of application No. 13/795,176, filed on Mar. 12, 2013, now Pat. No. 9,212,754.

(51) Int. Cl.
| | |
|---|---|
| *F16K 1/22* | (2006.01) |
| *G05D 23/02* | (2006.01) |
| *F16K 17/38* | (2006.01) |
| *F16K 31/02* | (2006.01) |
| *G05D 23/185* | (2006.01) |
| *F16K 31/00* | (2006.01) |
| *F16K 25/00* | (2006.01) |
| *F16K 27/02* | (2006.01) |
| *F16K 5/06* | (2006.01) |
| *F16K 27/06* | (2006.01) |

(52) U.S. Cl.
CPC .............. *F16K 1/221* (2013.01); *F16K 5/06* (2013.01); *F16K 5/0652* (2013.01); *F16K 17/386* (2013.01); *F16K 25/005* (2013.01); *F16K 27/0218* (2013.01); *F16K 27/067* (2013.01); *F16K 31/002* (2013.01); *F16K 31/003* (2013.01); *F16K 31/02* (2013.01); *G05D 23/1852* (2013.01)

(58) Field of Classification Search
CPC . F16K 1/221; F16K 5/06; F16K 5/062; F16K 17/386; F16K 25/005; F16K 27/0218; F16K 27/067; F16K 31/002; F16K 31/003; F16K 31/02; G05D 23/1852
See application file for complete search history.

(56) References Cited

U.S. PATENT DOCUMENTS

| | | | |
|---|---|---|---|
| 3,613,732 A | 10/1971 | Willson et al. | |
| 4,436,125 A | 3/1984 | Blenkush | |
| 4,549,717 A * | 10/1985 | Dewaegheneire | F16K 17/38 137/457 |
| 4,570,851 A | 2/1986 | Cirillo | |
| 4,806,815 A | 2/1989 | Honma | |
| 4,979,672 A | 12/1990 | AbuJudom, II et al. | |

(Continued)

FOREIGN PATENT DOCUMENTS

| | | |
|---|---|---|
| DE | 3637102 A1 | 5/1988 |
| EP | 2239486 A1 | 10/2010 |

(Continued)

*Primary Examiner* — Marc Norman
(74) *Attorney, Agent, or Firm* — Harness, Dickey & Pierce, PLC (57) ABSTRACT

A valve apparatus employs a shape memory alloy. In another aspect, a shape memory member acts as a lock or trigger in combination with a separate actuator or spring to move a valve. Still another aspect uses an externally mounted shape memory member to rotate a valve if an unsafe condition causes movement of the member.

20 Claims, 6 Drawing Sheets

(56) References Cited

U.S. PATENT DOCUMENTS

| | | | |
|---|---|---|---|
| 5,273,254 A | 12/1993 | McNaughton et al. | |
| 5,367,997 A * | 11/1994 | Kawamura | F02D 11/10 |
| | | | 123/399 |
| 5,396,769 A | 3/1995 | Brudnicki | |
| 5,584,432 A | 12/1996 | Lockhart | |
| 5,711,508 A | 1/1998 | Schreiber et al. | |
| 5,865,418 A | 2/1999 | Nakayama et al. | |
| 6,050,295 A | 4/2000 | Meisinger et al. | |
| 6,247,678 B1 | 6/2001 | Hines et al. | |
| 6,499,952 B1 | 12/2002 | Jacot et al. | |
| 6,557,824 B1 | 5/2003 | Jenski, Jr. et al. | |
| 6,840,257 B2 | 1/2005 | Dario et al. | |
| 9,212,754 B2 | 12/2015 | Jackson, Jr. | |
| 2005/0173661 A1 | 8/2005 | Mignon et al. | |
| 2005/0178988 A1 | 8/2005 | Biehl et al. | |
| 2006/0091342 A1 | 5/2006 | Butera et al. | |
| 2006/0273276 A1 | 12/2006 | Moretti et al. | |
| 2011/0031743 A1 | 2/2011 | Chaupin | |
| 2012/0151913 A1 | 6/2012 | Foshansky | |
| 2013/0020794 A1 * | 1/2013 | Stokes | E03C 1/0403 |
| | | | 285/8 |
| 2016/0201816 A1 * | 7/2016 | Rastegar | F16K 31/002 |
| | | | 137/2 |

FOREIGN PATENT DOCUMENTS

| | | |
|---|---|---|
| GB | 1267454 A | 3/1972 |
| JP | 2004019748 A | 1/2004 |
| JP | 2004052891 A | 2/2004 |
| JP | 2004156671 A | 6/2004 |
| JP | 2005315292 A | 11/2005 |
| JP | 2007315529 A | 12/2007 |
| KR | 20060082107 A | 7/2006 |
| KR | 20060110409 A | 10/2006 |
| WO | WO-1995002143 A1 | 1/1995 |
| WO | WO-2012101067 A1 | 8/2012 |
| WO | WO-2012125360 A2 | 9/2012 |

* cited by examiner

SHAPE MEMORY ALLOY VALVE

CROSS-REFERENCE TO RELATED APPLICATIONS

The present application is a divisional application of U.S. patent application Ser. No. 13/795,176, filed on Mar. 12, 2013, which is incorporated by reference herein.

BACKGROUND AND SUMMARY

The present disclosure relates generally to a valve and more particularly to a shape memory alloy valve.

Linearly moveable valves are known which use shape memory alloy ("SMA") wires to open and close the valves. It is noteworthy that such traditional valves used the SMA wires, often shaped as helically coiled springs, to directly actuate and linearly move the valves. Examples of these traditional valves are disclosed in U.S. Pat. No. 6,840,257 entitled "Proportional Valve with Shape Memory Alloy Actuator" which issued to Dario et al. on Jan. 11, 2005, and U.S. Pat. No. 5,865,418 entitled "Flow Control Valve" which issued to Nakayama et al. on Feb. 2, 1999. Both of these patents are incorporated by reference herein.

Another conventional valve uses coiled SMA wires for direct rotary actuation. This construction is disclosed in U.S. Pat. No. 5,396,769 entitled "Rotary Actuator" which issued to Brudnicki on Mar. 15, 1995. This patent is also incorporated by reference herein. The prior exemplary uses required both a heat-activated movement and a driving force by the same SMA wire which is not ideal. Furthermore, SMA wires are not as well suited for rotary motion as they are for linear motion.

In accordance with the present invention, a valve apparatus employs a shape memory alloy. In another aspect, a shape memory member acts as a lock or trigger in combination with a separate actuator or spring to move a valve. Still another aspect uses an externally mounted shape memory member to rotate a valve if an unsafe or targetted condition causes movement of the member. A method of operating a shape memory valve is also provided.

The present valve apparatus is advantageous over traditional valves. For example, the present valve is automatically controlled if an unsafe temperature or electrical signal-activated current moves the shape memory member. This is especially useful to prevent fuel or chemical remaining in a tube from draining onto a fire in a vehicular engine compartment or in a manufacturing plant. This is also beneficial for automatically allowing water to flow to a building sprinkler if a fire moves the shape memory member to open the valve. More reliable and consistent actuation forces and timing are achieved by separating a valve actuation mechanism from a shape memory lock or trigger. This separation also reduces part costs since a smaller quantity of the more expensive SMA is required as compared to inexpensive materials for a spring actuator. The actuation forces are also more predictable, tunable and consistent with off-the-shelf spring steel springs while not being significantly affected by environmental temperature changes as are SMA wires. Additional advantages and features of the present invention can be ascertained from the following description and claims, in addition to the appended drawings.

DETAILED DESCRIPTION

Referring to FIGS. 1-10, a preferred embodiment of a valve apparatus 21 includes a housing 23, a valve 25, a torsion spring actuator 27, and a shape memory alloy trigger or lock 29. Housing 23 includes an injection molded, engineering grade polymeric body 31 with a pair of quick connectors 33 on either end thereof defining a fluid-carrying and hollow passageway 35 internally therein. A hollow and cylindrical collar 37 perpendicularly upstands from body 31 such that the collar and quick connectors define a substantially inverted T-shape (as illustrated). Elongated and flexible conduits or tubes 39 externally surround spaced apart ridges 41 of quick connectors 33 so as to carry fluid from one tube 39 through passageway 35 of housing 23 and then through the other tube 39, when valve 25 is open. A circlip, compression ring or other external fastener removeably couples and clamps each tube 39 onto the associated quick connector.

Torsion spring actuator 27 includes a pair of laterally projecting tails 51 and a central helically looped section 53. Looped section 53 is concentrically mounted around an outside of collar 37 of housing. One tail 51 abuts against a side of a retension formation 55 upstanding from housing 23 and an opposite tail abuts against a tab 57 affixed to and moving with valve 25.

Valve 25 has butterfly style flow controlling faces 59 with an overmolded or assembled elastomeric seal on at least side edges thereof. Faces 59 are located within passageway 35 of housing and the side edges are curved to match an inside housing shape defining passageway 35. Furthermore, a centering pintle 60 downwardly projects from a distal end of valve faces 59 for receipt in a depression inside a bottom of passageway 35. A generally circular-cylindrical and hollow shaft 61 upwardly extends from faces 59 and concentrically extends through collar 37 of housing 23. An O-ring seal 62 is overmolded or assembled onto shaft 61. A laterally enlarged cap 63 extends from shaft 61 in a somewhat cup-shaped and concentric manner to sandwich collar 37 therebetween. A pair of flexible snap fit fingers 65 project from opposite sides of cap 63 for engagement with a peripherally enlarged lip 67 at a distal end of collar 37; this rotatably secures valve 25 to housing 23. Valve 25 is preferably injection molded from an engineering grade of polymeric material with an elastomeric material overmolded on faces 59 and the edges therebetween but not on pintle 60.

Shape memory alloy trigger or lock 29 is a generally inverted U-shaped (as illustrated) wire defined by a pair of generally parallel legs 71, with turned feet 73 on distal ends thereof, and an arcuate but unlooped and uncoiled middle bridging section 75 between the legs. SMA trigger 29 is preferably a nickel-titanium or copper zinc-aluminum metallic alloy. Feet 73 of SMA trigger 29 are trapped and retained within formations 55 external to housing 23. Middle bridging section 75 is arcuately depressed to engage within surfaces defining grooves, receptacles or slots 81 of valve cap 63, and also surfaces defining grooves, receptacles or slots 83 of housing collar 37. Grooves 81 and 83 are laterally aligned when valve 25 is in its nominal open operating position.

Figure 6:
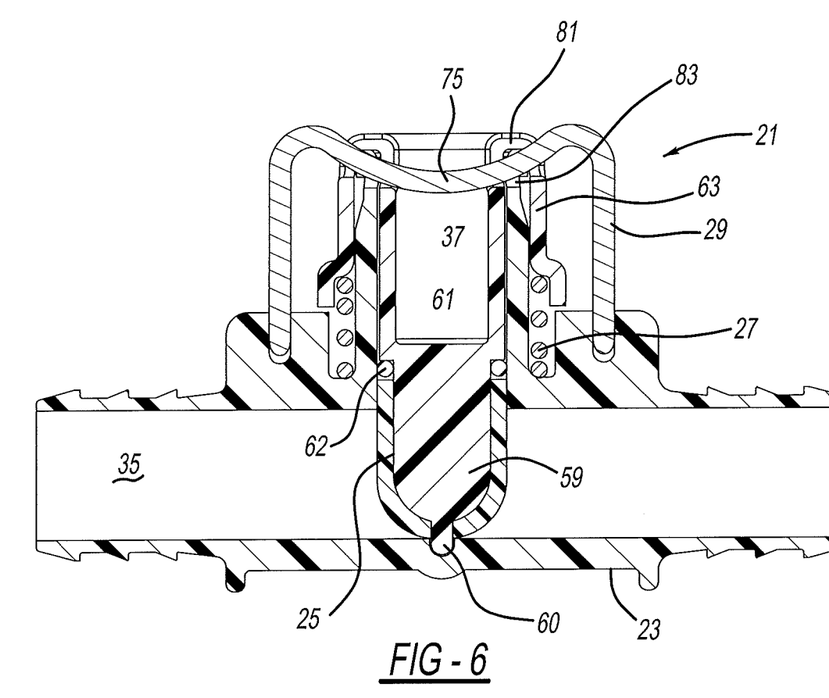
FIG. 6 is a cross-sectional view showing the preferred valve apparatus in an open operating condition.
Figure 7:
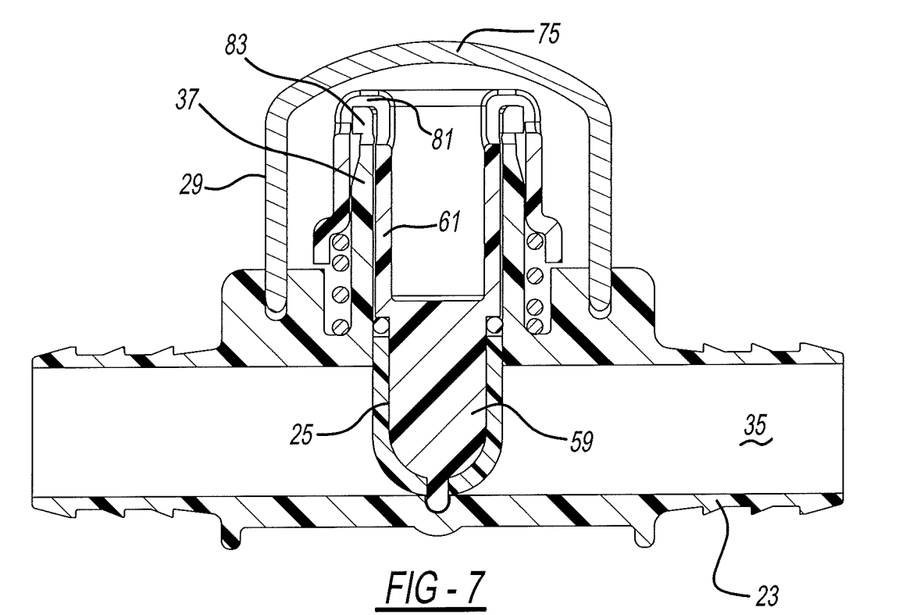
FIG. 7 is a cross-sectional view showing the preferred valve apparatus in an intermediate operating condition.

In operation as shown in FIGS. 6 and 7, valve 25 is in its nominal open position where flat faces 59 are parallel to an elongated fluid flow direction through passageway 35 of housing 23. This allows the fluid to flow therepast in a generally unobstructed manner. SMA trigger 29 locks valve 25 in the open position by engaging aligned grooves 81 and 83 (see FIGS. 4 and 5) of valve shaft 63 and housing collar 37, respectively. It is noteworthy that SMA trigger 29 is external to housing 23 for exposure to the environmental air, although a perforated cover may surround such.

With reference to FIG. 7, middle section 75 of SMA trigger 29 moves to an outwardly bulging and expanded orientation, disengaging and unlocking grooves 81 and 83, when SMA trigger 29 is heated past a movement or flexure transition temperature. This heating can be done by conducting an electrical current through SMA trigger 29, or through an environmental and external air temperature increase such as with a fire. If electricity is used, then SMA trigger acts as a resistor in an electrical circuit including a vehicular battery power supply, a ground, and a computer controller acting as a switch to energize the circuit based on a signal sent from an airbag deployment sensor, crash/rollover accelerometer sensor, engine temperature sensor or the like. For example, a 0.5-0.75 mm diameter SMA wire is employed for trigger 29 when a 12 volt power supply creates 4-6 amps of electricity.

Figure 8:
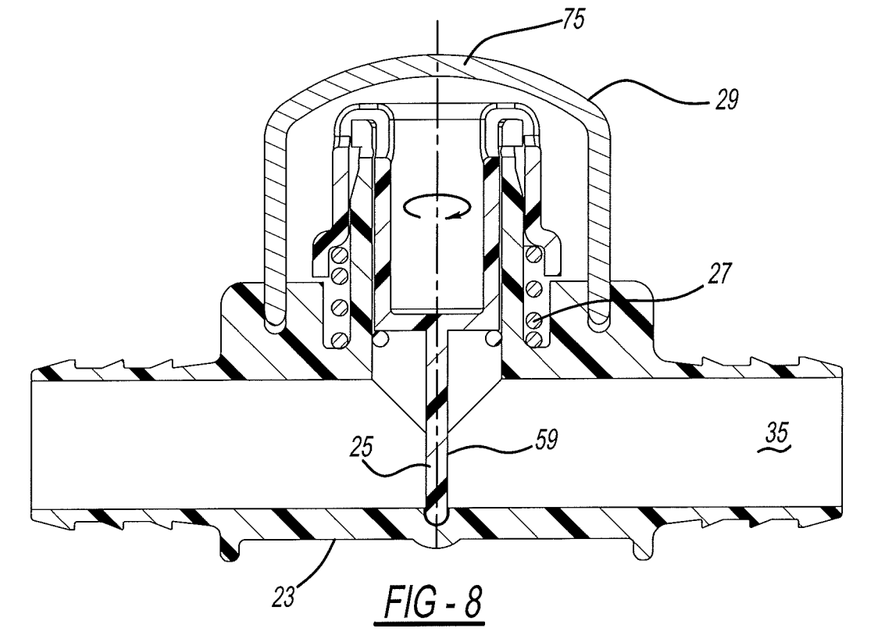
FIG. 8 is a cross-sectional view showing the preferred valve apparatus in a closed operating condition.
Figures 9, 10, 11:
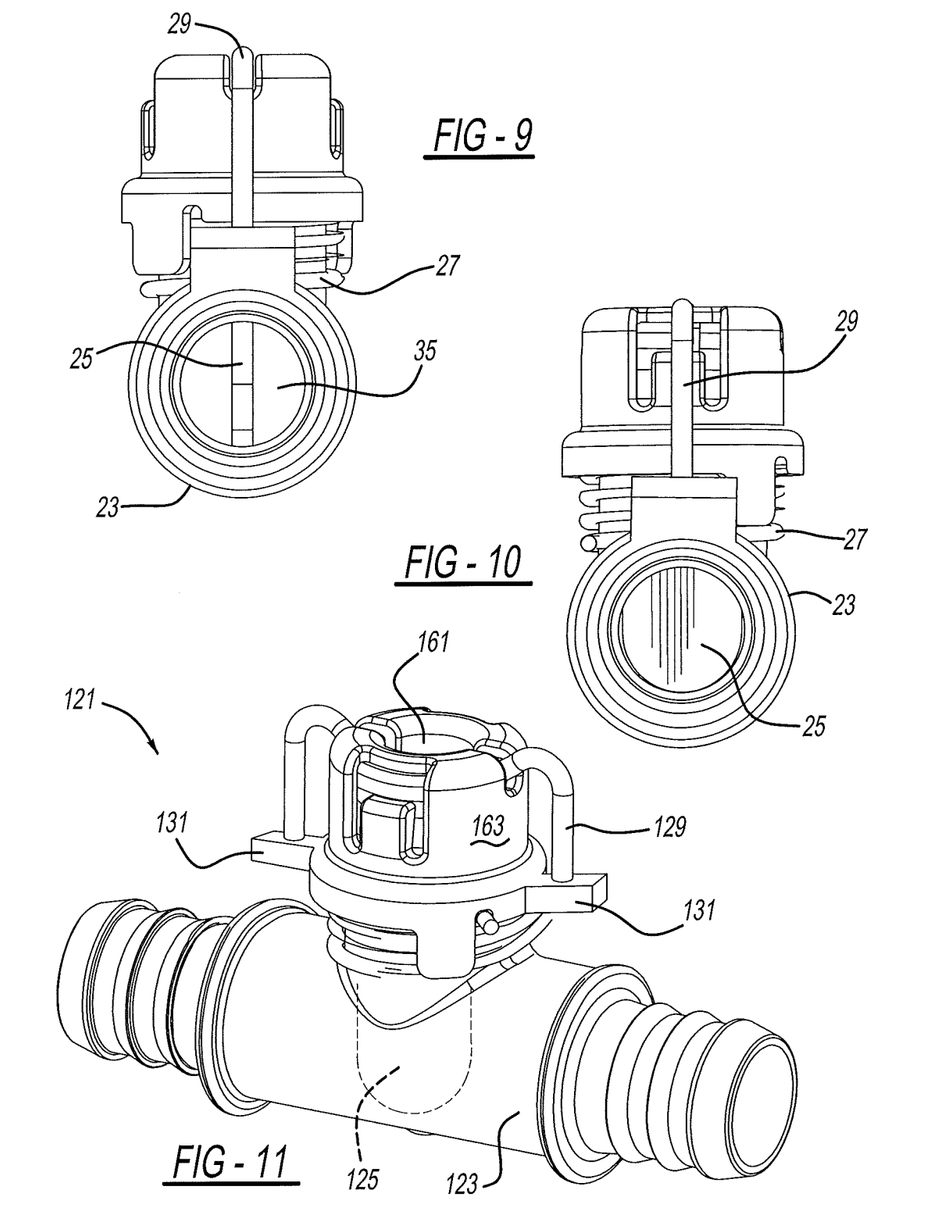
FIG. 9 is an end elevational view showing the preferred valve apparatus in an open operating condition.
FIG. 10 is an end elevational view showing the preferred valve apparatus in a closed operating condition.
FIG. 11 is a perspective view showing an alternate embodiment of a valve apparatus.

Torsion spring actuator 27 automatically rotates the integrated and single piece cap 63, shaft 61 and valve 29 to the closed position illustrated in FIGS. 8 and 10, when SMA trigger 29 releases the grooves. Thus, flat faces 59 of valve 25 are perpendicular to the elongated passageway 35, with the edges of valve 25 sealing against an inside surface of housing 23, thereby obstructing and blocking fluid flow through the housing. In this vehicular situation, fuel, such as gasoline, supplied by a fuel pump 91 which otherwise remains in fuel-carrying tube 39, is stopped from emptying past valve 25. Then when the dangerous condition ceases, a mechanic can manually rotate valve 25 back to its open position against the biasing force of spring 27 and reengage SMA trigger 29 in the grooves.

Figure 1:
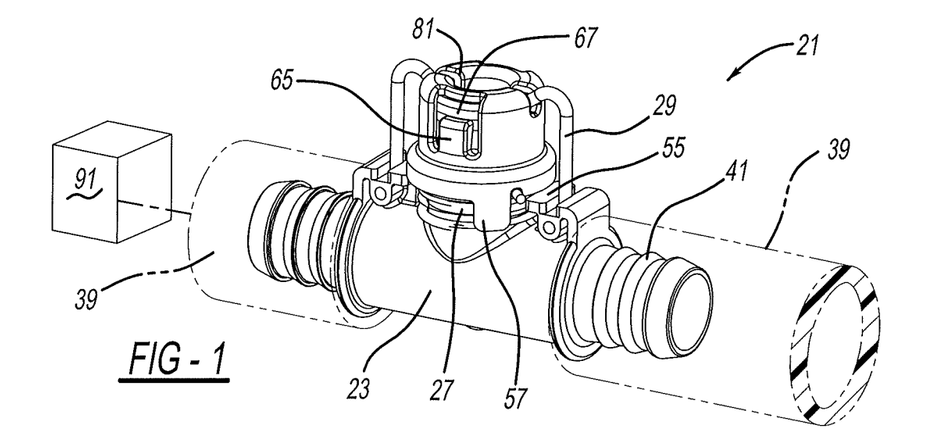
FIG. 1 is a perspective view showing a preferred embodiment of a valve apparatus of the present invention.
Figure 2:
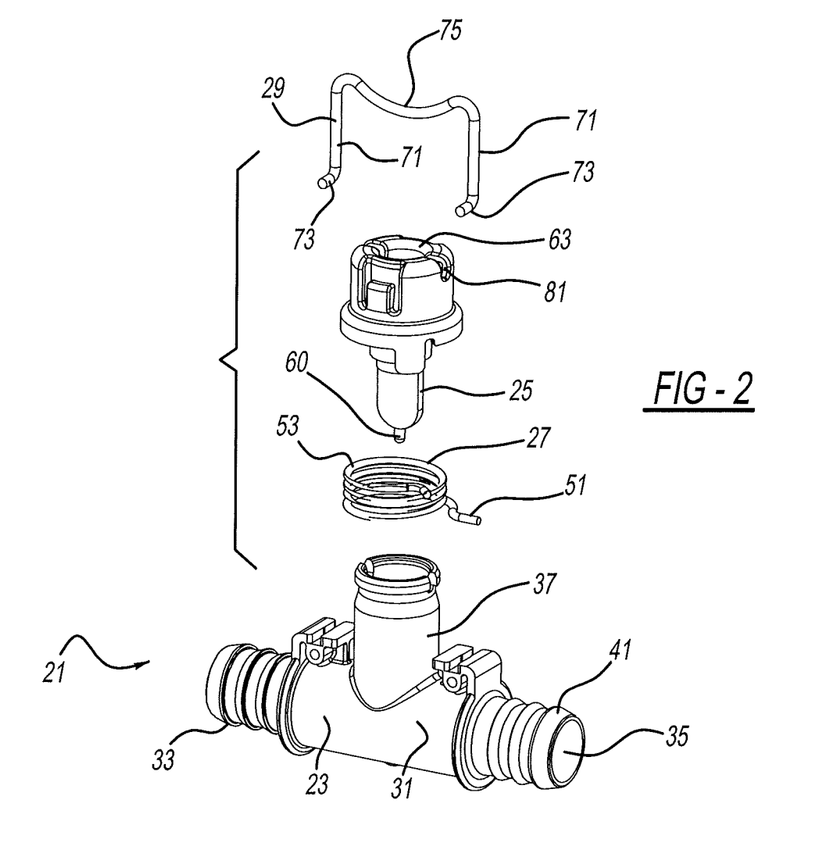
FIG. 2 is an exploded perspective view showing the preferred valve apparatus.
Figure 3:
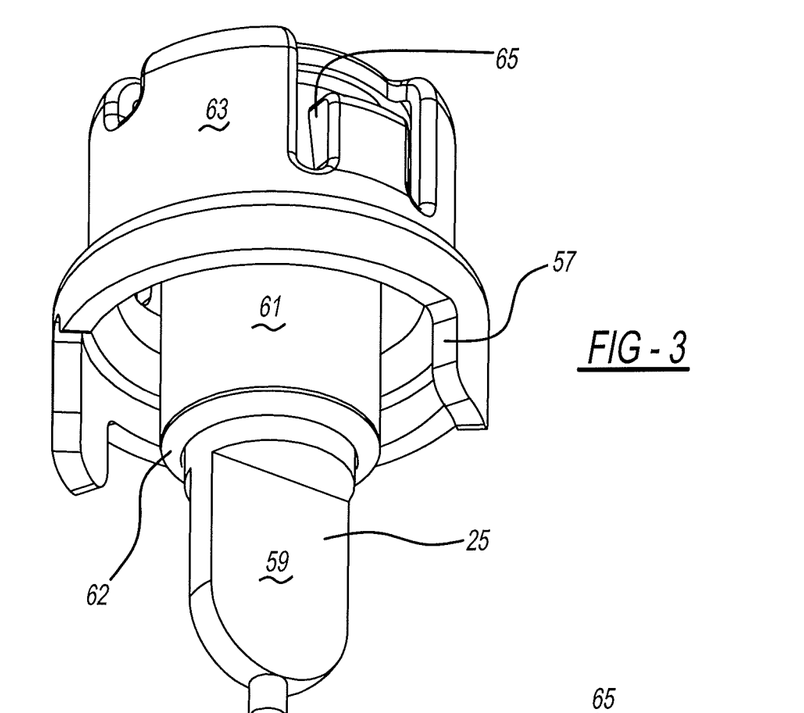
FIG. 3 is a perspective view showing a valve assembly employed in the preferred valve apparatus.
Figure 4:
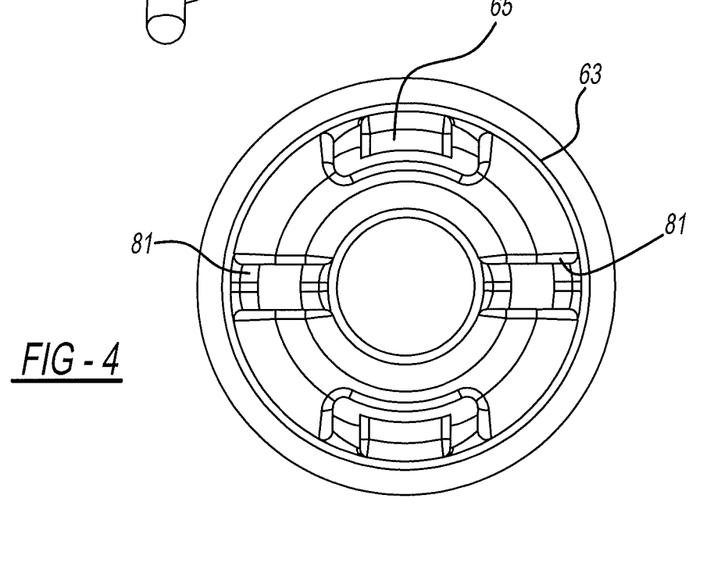
FIG. 4 is a top elevational view showing the valve assembly employed in the preferred valve apparatus.
Figure 5:
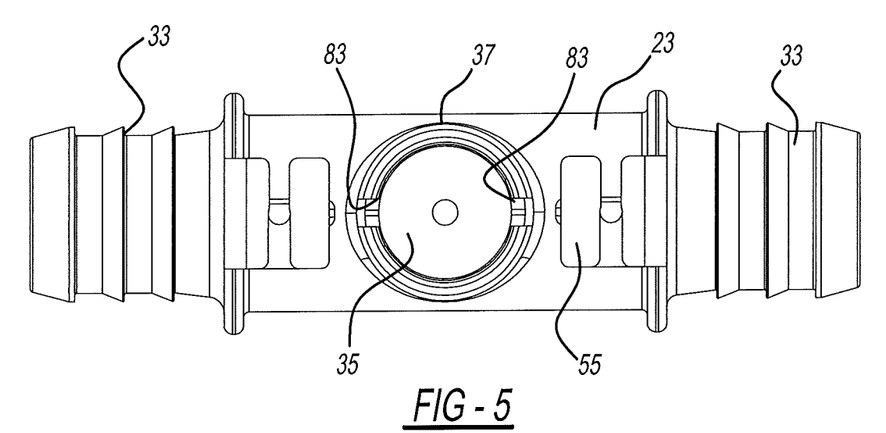
FIG. 5 is a top elevational view showing a housing employed in the preferred valve apparatus.

Referring to FIG. 1, another embodiment uses valve apparatus 21 in a chemical manufacturing plant. A chemical storage, refining or other processing device 91 supplies a chemical liquid or gaseous fluid through tubes 39. Valve 25 is automatically rotated closed in a fail-safe manner by spring actuator 27 if a fire or other dangerous environmental condition exists. Valve 25 and housing 23 are preferably made from cast or machined metal and of a larger size than in the vehicular version, however, SMA trigger 29, spring actuator 27 and valve 25 are otherwise similarly constructed and functioning to the vehicular system.

A further embodiment attaches a water sprinkler 91 to valve apparatus 21 for use in extinguishing fires in a building. This system is similar to the prior vehicular or manufacturing plant versions, however, the fail-safe mode opens the valve. This can be done by orienting valve shaft and housing collar grooves 81 and 83 perpendicular to those shown in FIGS. 4 and 5.

An alternate embodiment valve apparatus 121 can be observed in FIG. 11. This device is identical in structure and function to that shown in FIGS. 1 and 2, except that the end feet of an SMA trigger 129 are secured to wings 131 laterally projecting from an outside of a cap 163 integrally coupled to a shaft 161 and a valve 125. This allows for easier modularized preassembly of SMA trigger 129 to valve 125 before it is moveably coupled to a quick connector housing 123.

Figure 12:
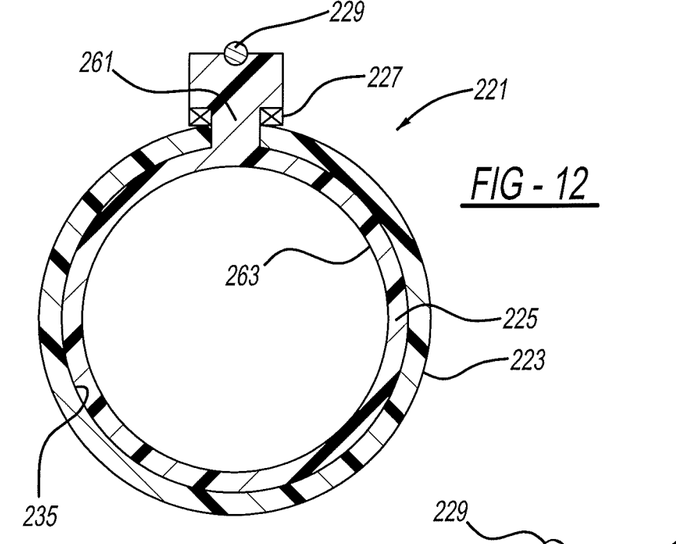
FIG. 12 is a cross-sectional view showing another alternate embodiment of a valve apparatus in an open condition.
Figure 13:
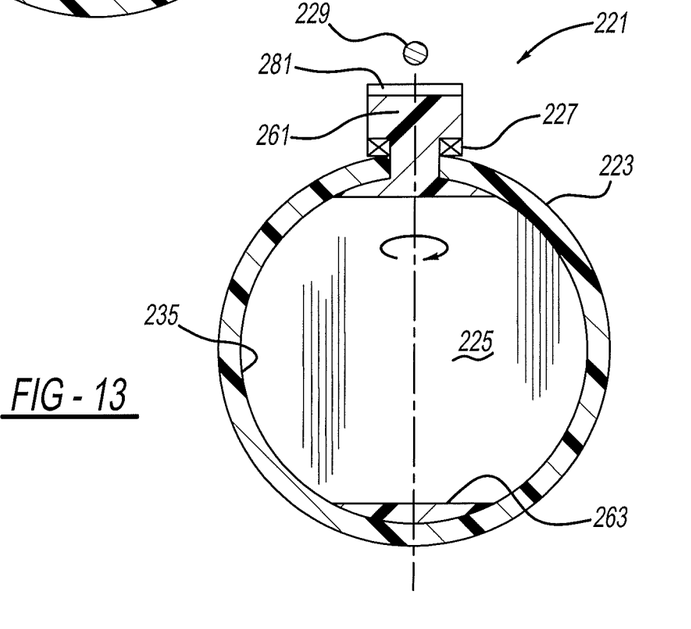
FIG. 13 is a cross-sectional view showing the alternate valve apparatus of FIG. 12 in a close condition.

FIGS. 12 and 13 show another alternate embodiment valve apparatus 221. A spherical ballcock valve 225 is located within a passageway 235 of a housing 223 with an integral shaft 261 extending therethrough. A circular-cylindrical fluid flow through-bore 263 extends through valve 225 for concentric alignment within housing passageway 235 when valve 225 is in its open position. A lateral groove 281 is in a top of shaft 261 to operably receive an SMA trigger 229 in its nominal and open condition (see FIG. 12). A torsion spring 227 is likewise provided with this embodiment as in the prior ones described hereinabove.

Various embodiments have been disclosed herein, but it should be appreciated that other variations may be made. For example, a leaf or tension spring can replace the torsion spring actuator although certain benefits will not be realized. Moreover, different housing shapes and constructions may be employed but various advantageous will not be achieved. Furthermore, it is envisioned that shape memory members of different shapes and materials (such as shape memory polymers) may engage/disengage these or other abutment surfaces and receptacles, however, certain benefits may be forfeited. It should also be appreciated that the present valve apparatus may be inverted or otherwise reoriented; thus, terms such as "top," "bottom," "upper," "lower," "upward," "downward" and the like should not be considered as limiting since they simply describe the exemplary embodiments as illustrated herein. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A valve apparatus comprising:
   (a) a valve;
   (b) a housing including an internal passageway within which the valve is located;
   (c) a shape memory trigger movable in response to environmental and external heat;
   (d) an actuator automatically rotating the valve and changing a flow condition of the valve based upon movement of the shape memory trigger; and
   (e) the heat causing the valve to move to a fail-safe position on at least one of the following:
      (i) a vehicular fuel tube connected to the housing with the valve blocking fuel flowing from the tube;
      (ii) a manufacturing plant tube connected to the housing with the valve blocking chemicals flowing from the tube; or (iii) a building sprinkler connected to the housing with the valve opening to allow water to flow to the sprinkler.

2. The valve apparatus of claim 1, wherein the actuator is a spring which is separate from the shape memory trigger and is not a shape memory alloy.

3. The valve apparatus of claim 1, wherein the housing is polymeric and the shape memory trigger is a metallic and unlooped wire.

4. The valve apparatus of claim 1, wherein the shape memory trigger and actuator are mounted to an outside of the housing so that the shape memory trigger is exposed to ambient air.

5. The valve apparatus of claim 1, wherein the vehicular fuel tube is connected to the housing.

6. The valve apparatus of claim 1, wherein the chemical-carrying manufacturing plant tube is connected to the housing.

7. The valve apparatus of claim 1, wherein the water-carrying building sprinkler is connected to the housing.

8. The valve apparatus of claim 1, wherein:
the valve includes a rotating and substantially spherical ball valve with a bore therethrough; and
the housing includes a polymeric quick connector with spaced apart ridges adapted to receive a flexible tube thereon.

9. A valve apparatus comprising:
(a) a rotating butterfly valve with flat closing faces;
(b) a housing including an internal passageway within which the valve is located, the housing further including a polymeric quick connector with spaced apart ridges adapted to receive a flexible tube thereon;
(c) a shape memory trigger movable in response to environmental and external heat;
(d) an actuator automatically changing a flow condition of the valve based upon movement of the shape memory trigger; and
(e) the heat causing the valve to move to a fail-safe position on at least one of the following:
(i) a vehicular fuel tube connected to the housing with the valve blocking fuel flowing from the tube;
(ii) a manufacturing plant tube connected to the housing with the valve blocking chemicals flowing from the tube; or
(iii) a building sprinkler connected to the housing with the valve opening to allow water to flow to the sprinkler.

10. The valve apparatus of claim 9, wherein the actuator rotates the valve if the heat moves the shape memory trigger.

11. The valve apparatus of claim 9, wherein the shape memory trigger, being an elongated and unlooped wire, and the actuator are mounted to an outside of the housing so that the shape memory wire is exposed to ambient air.

12. A valve apparatus comprising:
(a) a valve;
(b) a housing including an internal passageway within which the valve is located;
(c) a shape memory wire movable in response to at least one changeable operating condition of: (a) environmental and external heat, or (b) electricity;
(d) an actuator automatically changing a flow condition of the valve based upon movement of the shape memory wire;
(e) a change in the operating condition causing the valve to move to a fail-safe position on a vehicular fuel tube connected to the housing with the valve being adapted to block fuel flowing from the tube; and
(f) the shape memory wire and actuator being mounted to an outside of the housing so that the shape memory wire is exposed to ambient air.

13. The valve apparatus of claim 12, wherein the actuator rotates the valve if the heat causes movement of the shape memory wire.

14. The valve apparatus of claim 12, wherein the actuator rotates the valve if the electricity causes movement of the shape memory wire.

15. The valve apparatus of claim 12, wherein the actuator is a spring which is separate from the shape memory wire and is not a shape memory alloy.

16. The valve apparatus of claim 12, wherein the housing is polymeric and the shape memory wire is metallic and unlooped.

17. A valve apparatus comprising:
(a) a valve;
(b) a fluid connector including an internal passageway within which the valve is located;
(c) a shape memory trigger movable in response to environmental and external heat;
(d) a spring automatically changing a flow condition of the valve based upon movement of the shape memory trigger;
(e) the heat causing the valve to move to a fail-safe position on at least one of the following:
(i) a vehicular fuel tube connected to the fluid connector with the valve blocking fuel flowing from the tube;
(ii) a manufacturing plant tube connected to the fluid connector with the valve blocking chemicals flowing from the tube; or
(iii) a building sprinkler connected to the fluid connector with the valve opening to allow water to flow to the sprinkler; and
(f) the trigger being mounted outside of the fluid connecter.

18. The valve apparatus of claim 17, wherein the vehicular fuel tube is connected to the fluid connector.

19. The valve apparatus of claim 17, wherein the chemical-carrying manufacturing plant tube is connected to the fluid connector.

20. The valve apparatus of claim 17, wherein the water-carrying building sprinkler is connected to the fluid connector.

* * * * *